US012664680B2

(12) United States Patent
Araújo et al.

(10) Patent No.: US 12,664,680 B2
(45) Date of Patent: Jun. 23, 2026

(54) LOCALIZATION AND MAPPING BY A GROUP OF MOBILE COMMUNICATIONS DEVICES

(71) Applicant: Telefonaktiebolaget LM Ericsson (publ), Stockholm (SE)

(72) Inventors: José Araújo, Stockholm (SE); Volodya Grancharov, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 656 days.

(21) Appl. No.: 17/919,365

(22) PCT Filed: Apr. 17, 2020

(86) PCT No.: PCT/EP2020/060923
§ 371 (c)(1),
(2) Date: Oct. 17, 2022

(87) PCT Pub. No.: WO2021/209158
PCT Pub. Date: Oct. 21, 2021

(65) Prior Publication Data
US 2023/0196613 A1 Jun. 22, 2023

(51) Int. Cl.
*G06T 7/73* (2017.01)
*G06T 17/00* (2006.01)
(Continued)

(52) U.S. Cl.
CPC .................. *G06T 7/74* (2017.01); *G06T 7/73* (2017.01); *G06T 17/00* (2013.01); *H04W 12/02* (2013.01);
(Continued)

(58) Field of Classification Search
CPC ............. G06T 7/74; G06T 2207/10024; G06T 2207/10028; G06T 2207/10016;
(Continued)

(56) References Cited

U.S. PATENT DOCUMENTS

| | | | |
|---|---|---|---|
| 2010/0208889 A1* | 8/2010 | Humphrey | ............ H04L 9/0894 380/278 |
| 2014/0267234 A1* | 9/2014 | Hook | ................... G06T 19/006 345/419 |

(Continued)

OTHER PUBLICATIONS

Éluard, M., Maetz, Y. and Doërr, G., Impact of geometry-preserving encryption on rendering time, 2014 IEEE International Conference on Image Processing (ICIP), Paris, France, pp. 4787-4791, doi: 10.1109/ICIP.2014.7025970 (Year: 2014).*

Yonetani, R., Naresh Boddeti, V., Kitani, K.M. and Sato, Y., Privacy-preserving visual learning using doubly permuted homomorphic encryption, 2017, Proceedings of the IEEE international conference on computer vision, pp. 2040-2050, https://doi.org/10.48550/arXiv. 1704.02203. (Year: 2017).*

(Continued)

*Primary Examiner* — Andrew W Bee
*Assistant Examiner* — Emma E Dryden
(74) *Attorney, Agent, or Firm* — Sage Patent Group

(57) ABSTRACT

A mobile communications device for performing localization and mapping comprising at least one visual sensor for capturing visual sensor data of a local environment, and operative to derive key-point descriptors from the visual sensor data which represent visual features of the local environment, derive concealed representations of the derived key-point descriptors, by applying a current permutation to the derived key-point descriptors, determine a pose of the mobile communications device relative to a point-cloud map representing the local environment, map the derived key-point descriptors onto the point-cloud map, thereby associating each derived key-point descriptor with a position in the point-cloud map, and transmit the concealed representations of the derived key-point descriptors, together with their associated positions in the point-cloud map, to a map server. The current permutation is a shared secret, or is derivable from a shared secret, which shared secret is available to a group of mobile communications devices.

18 Claims, 5 Drawing Sheets

(51) Int. Cl.
H04W 12/02 (2009.01)
H04W 64/00 (2009.01)

(52) U.S. Cl.
CPC ... H04W 64/00 (2013.01); G06T 2207/10028 (2013.01)

(58) Field of Classification Search
CPC . G06T 2207/30204; G06T 7/579; G06T 7/73; G06T 17/00; H04W 64/00; H04W 12/033; H04W 12/63; H04W 4/026; H04W 4/38; H04W 4/44; H04W 4/029; H04W 12/02; H04W 12/04; H04W 12/0471; H04W 12/041; H04W 12/043; H04W 12/00; H04W 12/0433; H04W 12/0431; H04L 63/061; H04L 9/085; H04L 63/0428; H04L 63/0478; H04L 63/0435

See application file for complete search history.

(56) References Cited

U.S. PATENT DOCUMENTS

| | | | |
|---|---|---|---|
| 2020/0036538 A1* | 1/2020 | Ramlall | H03K 3/037 |
| 2020/0126256 A1* | 4/2020 | Sinha | G06T 17/10 |

OTHER PUBLICATIONS

Jolfaei, A., Wu, X-W. and Muthukkumarasamy, V., a 3D Object Encryption Scheme Which Maintains Dimensional and Spatial Stability, Feb. 2015, in IEEE Transactions on Information Forensics and Security, vol. 10, No. 2, pp. 409-422, doi: 10.1109/TIFS.2014.2378146 (Year: 2015).*

International Search Report and Written Opinion of the International Searching Authority for PCT International Application No. PCT/EP2020/060923 dated Jan. 18, 2021.

International Preliminary Report on Patentability for PCT International Application No. PCT/EP2020/060923 dated Apr. 13, 2022, including response to Written Opinion.

Speciale et al., "Privacy Preserving Image-Based Localization", 2019 IEEE/CVF Conference on Computer Vision and Pattern Recognition (CVPR), IEEE, Jun. 15, 2019, pp. 5488-5498.

Magdy et al., "Effect of chosen features on performance of privacy preserving image retrieval systems", Computers & Electrical Engineering, vol. 76, Jun. 1, 2019, pp. 411-424.

Xin Jin et al., "3D Point Cloud Encryption through Chaotic Mapping", PCM 2016: 17th Pacific-Rim Conference on Advances in Multimedia Information Processing—vol. 9916, Sep. 2016, pp. 119-129.

* cited by examiner

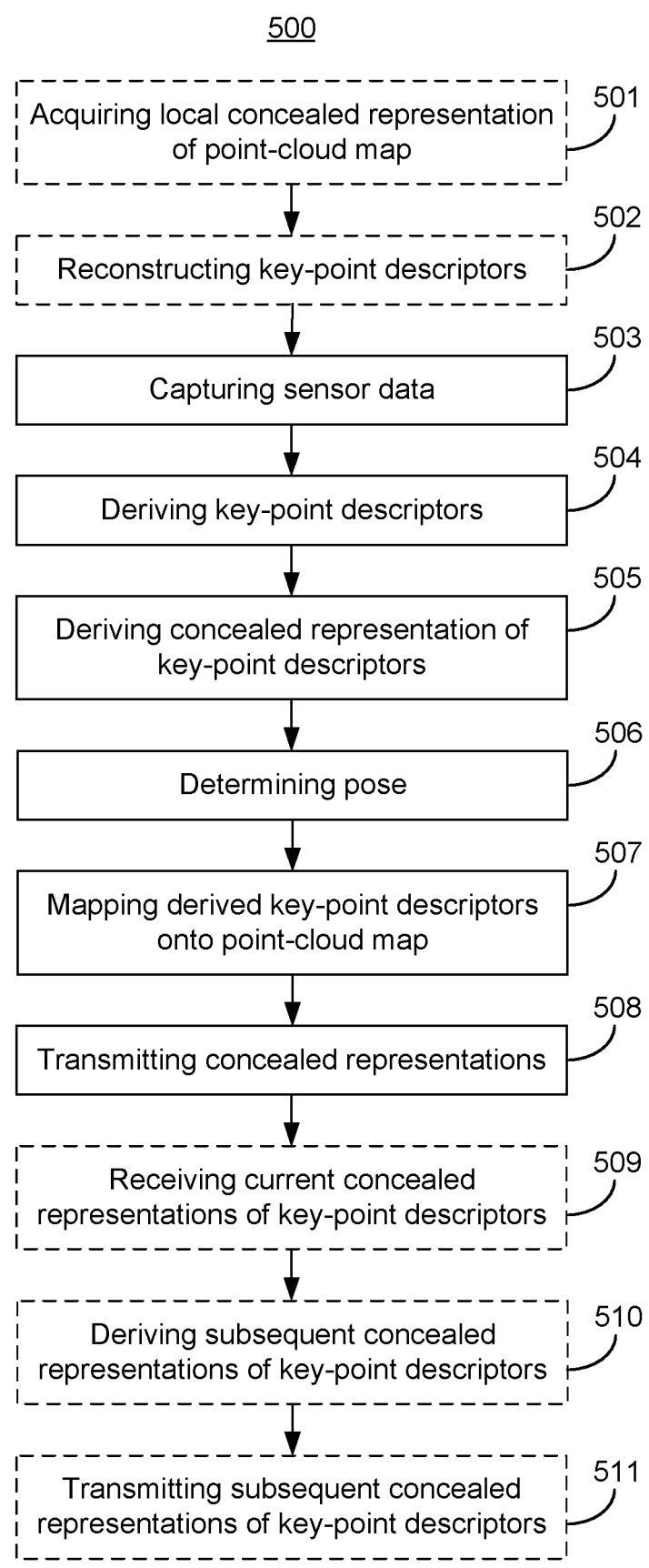

500

501 Acquiring local concealed representation of point-cloud map

502 Reconstructing key-point descriptors

503 Capturing sensor data

504 Deriving key-point descriptors

505 Deriving concealed representation of key-point descriptors

506 Determining pose

507 Mapping derived key-point descriptors onto point-cloud map

508 Transmitting concealed representations

509 Receiving current concealed representations of key-point descriptors

510 Deriving subsequent concealed representations of key-point descriptors

511 Transmitting subsequent concealed representations of key-point descriptors

Fig. 6

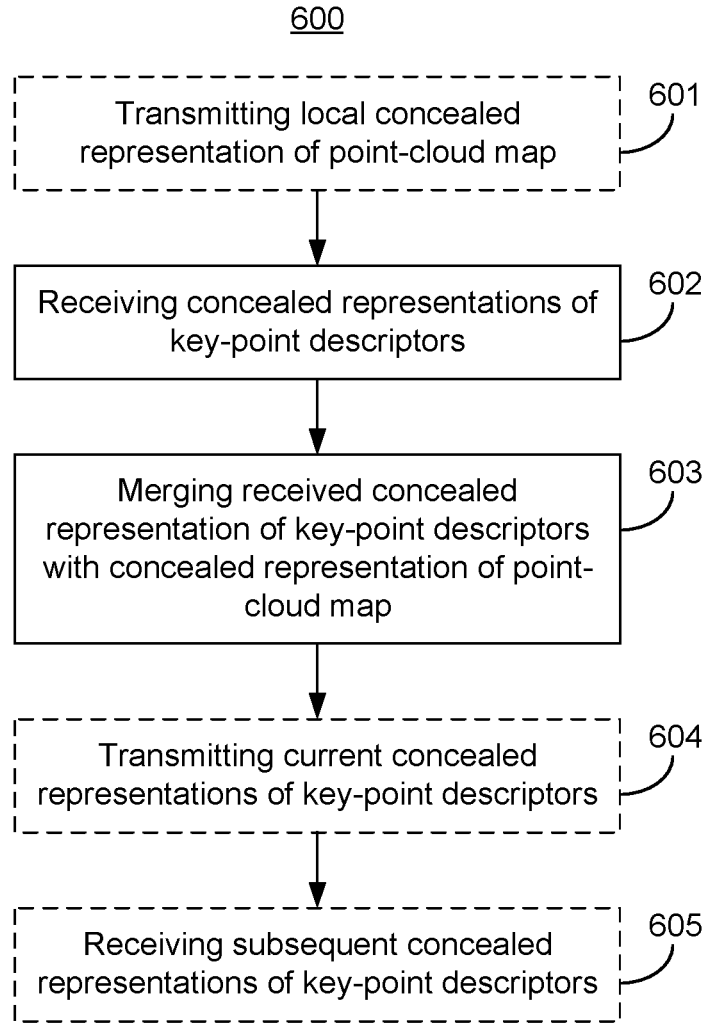

600

Transmitting local concealed
representation of point-cloud map

601

Receiving concealed representations of
key-point descriptors

602

Merging received concealed
representation of key-point descriptors
with concealed representation of point-
cloud map

603

Transmitting current concealed
representations of key-point descriptors

604

Receiving subsequent concealed
representations of key-point descriptors

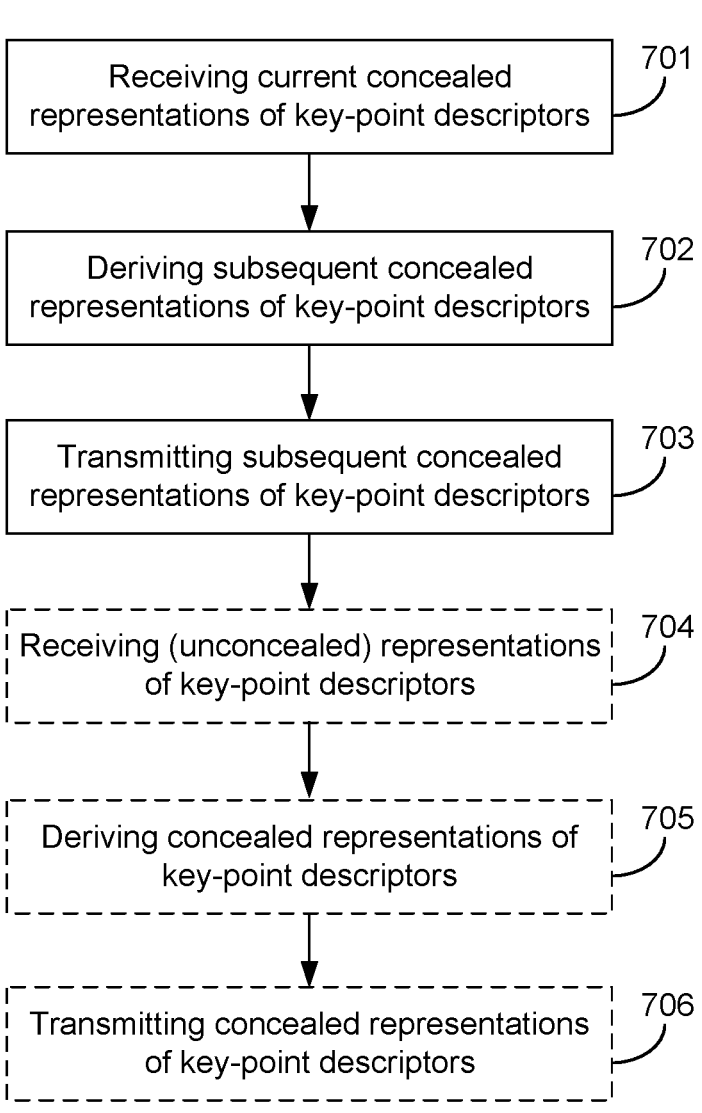

700

Receiving current concealed
representations of key-point descriptors          701

Deriving subsequent concealed
representations of key-point descriptors          702

Transmitting subsequent concealed
representations of key-point descriptors          703

Receiving (unconcealed) representations
of key-point descriptors                          704

Deriving concealed representations of
key-point descriptors                             705

Transmitting concealed representations
of key-point descriptors                          706

LOCALIZATION AND MAPPING BY A GROUP OF MOBILE COMMUNICATIONS DEVICES

CROSS-REFERENCE TO RELATED APPLICATION

This application is a 35 U.S.C. § 371 national stage application of PCT International Application No. PCT/EP2020/060923 filed Apr. 17, 2020, the contents of which are hereby incorporated by reference herein.

TECHNICAL FIELD

The invention relates to a mobile communications device for performing localization and mapping, a map server for supporting localization and mapping by a group of mobile communications devices, a trusted server for supporting localization and mapping by a group of mobile communications devices, a method for performing localization and mapping, performed by a mobile communications device, a method for supporting localization and mapping by a group of mobile communications devices, performed by a map server, a method for supporting localization and mapping by a group of mobile communications devices, performed by a trusted server, corresponding computer programs, corresponding computer-readable storage media, and corresponding data carrier signals.

BACKGROUND

There is a growing interest in utilizing information which represents the structure and/or visual appearance of real-world scenes surrounding mobile communications devices, given the wider availability of sensors for capturing data representing the devices' local environment, such as monocular cameras, RGB cameras, stereo depth cameras, LiDAR sensors, and the like, and algorithms based on which structural and/or visual information can be derived. For example, this may be used for constructing maps, 3D models, or digital twins, of an environment and using such information for performing precise localization of mobile communications devices indoors and outdoors. This is essential to applications such as autonomous driving and Augmented/Mixed Reality (AR/MR). Maps which are constructed based on captured sensor data are typically stored as point clouds. A point cloud is a set of points in (three-dimensional, 3D) space, where each point comprises coordinates of the point in 3D space.

Frequently, point clouds representing 3D models comprise key points and descriptors which are extracted from visual sensor data, such as digital images captured by monocular or RGB cameras. A key point is a pair of coordinates specifying the location of one or more pixels in a particular image. There are multiple algorithms which can be used to determine the location of the key points. For example, key points can be extracted by means of a Harris Corner Detector or corners detected by Features from Accelerated Segment Test (FAST). Alternatively, one can use Speeded Up Robust Features (SURF) to extract key points based on the approximation of the determinant of the Hessian matrix. Another known approach is based on Scale-Invariant Feature Transform (SIFT), which relies on difference-of-Gaussians to detect points which are invariant to scale and orientation. Key points can be also selected as center of blobs (image regions) calculated by a Maximally Stable Extremal Regions (MSER) method.

Once a key point is extracted from visual sensor data, the image area in the vicinity of the key point (the local image area) is characterized by means of a descriptor $D_i$, which typically is a finite vector of dimension N, $D_i=[d_1, d_2, \ldots, d_N]$. Accordingly, a set of key-point descriptors $\{D_1, D_2, \ldots, D_K\}$ represents the visual appearance of one or more objects or a scene in the image. Different types of key-point descriptors are known in the art. An example is the SURF descriptor, which is a 64-dimensional vector of floating-point values which are based on the sum of the Haar wavelet response around the key point. An alternative is the SIFT descriptor, which is a 128-dimensional vector which is calculated by aggregating histograms of gradient magnitudes around the key point. Another type of descriptor is known as Histogram of Oriented Gradients (HOG), which characterizes the local visual appearance around a key point by means of concatenated histograms of gradient directions. As yet another example, the Binary Robust Independent Elementary Features (BRIEF) descriptor is a binary version of the SIFT descriptor in the form of a 128-bits number.

A known class of algorithms which is commonly used for localization of mobile communications devices is referred to as SLAM (Simultaneous Localization And Mapping). In navigation, robotic mapping, odometry for Virtual Reality (VR) or AR/MR, and similar applications, SLAM is the computational problem of constructing or updating a map of an environment while simultaneously keeping track of the location of an agent moving through the environment, such as a mobile communications device which is equipped with sensors based on which structural and visual information of the environment can be derived and stored in a point cloud.

The sensor data which is used for updating a map of an environment can be captured by multiple mobile communications devices, at possibly different time instances. This has driven an interest in merging structural and/or visual information, such as point clouds including key points and descriptors which are derived based on sensor data captured by different mobile communications devices, in the edge or cloud, where it can be made available for other mobile communications devices. This is also referred to as collaborative mapping.

However, since the captured data represents local environments of mobile communications devices, including objects, measures, sizes of spaces, and their visual appearance, there is a privacy concern in merging structural and/or visual information derived from sensor data, which is collected from multiple mobile communications devices, into a collaborative map repository which is stored in in the edge or the cloud. This is the case since such a map can potentially be used by third parties for analytics, object recognition, and targeted advertising. For instance, the provider of the edge or cloud storage service may perform analytics and object recognition on the map. Since key-point descriptors capture the visual appearance of one or more objects or a scene, they may be used in a scene or object recognition applications. This is typically done by means of a Bag of Words (BoW) model, by building a visual vocabulary from a very large set of key-point descriptors $\{D_1, D_2, \ldots, D_K\}$, which are extracted from diverse types of visual content (images) using a Gaussian Mixture Model (GMM) or k-means clustering, and matching sets of descriptors which belong to a region of interest to the centroids of the visual vocabulary to create a histogram $H(\{D_1, D_2, \ldots, D_K\})$ for the set of key-point descriptors.

In both SLAM and Structure-from-Motion (SfM), which is another technique for mapping of 3D scenes, key points and their descriptors are key elements to 3D modeling. They rely on matching key points and projecting them into the 3D scene, and estimating the depth of the scene from the matched key points by means of triangulation. The matching of key points is achieved by calculating distances between key-points descriptors, e.g., as the Euclidean norm $e_{ij}$, $$e_{ij}=\|D_i-D_j\|=\sqrt{\Sigma_k(d_{i,k}-d_{j,k})^2}.$$

The privacy of collaborative mapping has been considered one of the most important problems to be solved in AR/MR applications. Encryption of 3D point-cloud information, which may include key-point descriptors, has been proposed in "3D Point Cloud Encryption Through Chaotic Mapping", by Xin Jin, Zhaoxing Wu, Chenggen Song, Chunwei Zhang, and Xiaodong Li, in PCM 2016: 17th Pacific-Rim Conference on Advances in Multimedia Information Processing, Volume 9916, pages 119-129, https://doi.org/10.1007/978-3-319-48890-5_12, ACM, 2016). Encryption successfully protects the privacy of the real-world scene but hinders merging of point clouds derived by sensor data obtained from different mobile communications devices. Accordingly, it prevents a continuous update of the point cloud by collaborative mapping.

SUMMARY

It is an object of the invention to provide an improved alternative to the above techniques and prior art.

More specifically, it is an object of the invention to provide improved solutions for preserving the privacy of visual information in collaborative mapping.

These and other objects of the invention are achieved by means of different aspects of the invention, as defined by the independent claims. Embodiments of the invention are characterized by the dependent claims.

According to a first aspect of the invention, a mobile communications device for performing localization and mapping is provided. The mobile communications device comprises at least one visual sensor and processing circuitry. The at least one visual sensor is operative to capture visual sensor data of a local environment of the mobile communications device. The processing circuitry causes the mobile communications device to be operative to derive key-point descriptors from the visual sensor data. The derived key-point descriptors represent visual features of the local environment. The processing circuitry further causes the mobile communications device to be operative to derive concealed representations of the derived key-point descriptors. The concealed representations of the derived key-point descriptors are derived by applying a current permutation to the derived key-point descriptors. The processing circuitry further causes the mobile communications device to be operative to determine a pose of the mobile communications device relative to a point-cloud map representing the local environment, and to map the derived key-point descriptors onto the point-cloud map. Thereby, each derived key-point descriptor is associated with a position in the point-cloud map. The processing circuitry further causes the mobile communications device to be operative to transmit the concealed representations of the derived key-point descriptors to a map server. The concealed representations of the derived key-point descriptors are transmitted together with their associated positions in the point-cloud map. The current permutation is a shared secret or is derivable from a shared secret. The shared secret is available to a group of mobile communications devices comprising the mobile communications device.

According to a second aspect of the invention, a map server for supporting localization and mapping by a group of mobile communications devices is provided. The map server comprises processing circuitry which causes the map server to be operative to receive concealed representations of key-point descriptors from one or more mobile communications devices of the group of mobile communications devices. The processing circuitry further causes the map server to be operative to merge the received concealed representations of key-point descriptors with a concealed representation of a point-cloud map representing local environments of the one or more mobile communications devices. The concealed representation of the point-cloud map comprises concealed representations of key-point descriptors which represent visual features of the local environments. The received concealed representations of key-point descriptors and the concealed representations of key-point descriptors comprised in the concealed representation of the point-cloud map are derivable by applying a current permutation to the key-point descriptors derived by the one or more mobile communications devices and the key-point descriptors comprised in the point-cloud map, respectively. The current permutation is a shared secret or is derivable from a shared secret. The shared secret is available to the group of mobile communications devices.

According to a third aspect of the invention, a trusted server for supporting localization and mapping by a group of mobile communications devices is provided. The trusted server comprises processing circuitry which causes the trusted server to be operative to receive current concealed representations of key-point descriptors from a map server and derive subsequent concealed representations of the key-point descriptors from the received current concealed representations of key-point descriptors. The subsequent concealed representations are different from the current concealed representations. The processing circuitry further causes the trusted server to be operative to transmit the subsequent concealed representations of the key-point descriptors to the map server. The current concealed representations of the key-point descriptors are derivable from the key-point descriptors by applying a current permutation to the key-point descriptors. The current permutation is a shared secret or is derivable from a shared secret. The shared secret is available to the group of mobile communications devices.

According to a fourth aspect of the invention, a method for performing localization and mapping is provided. The method is performed by a mobile communications device. The method comprises capturing visual sensor data of a local environment of the mobile communications device. The visual sensor data is captured using at least one visual sensor comprised in the mobile communications device. The method further comprises deriving key-point descriptors from the visual sensor data. The derived key-point descriptors represent visual features of the local environment. The method further comprises deriving concealed representations of the derived key-point descriptors. The concealed representations of the derived key-point descriptors are derived by applying a current permutation to the derived key-point descriptors. The method further comprises determining a pose of the mobile communications device relative to a point-cloud map representing the local environment, and mapping the derived key-point descriptors onto the point-cloud map. Thereby, each derived key-point descriptor is associated with a position in the point-cloud map. The method further comprises transmitting the concealed representations of the derived key-point descriptors to a map server. The concealed representations of the derived key-point descriptors are transmitted together with their associated positions in the point-cloud map. The current permutation is a shared secret or is derivable from a shared secret. The shared secret is available to a group of mobile communications devices comprising the mobile communications device.

According to a fifth aspect of the invention, a method for supporting localization and mapping by a group of mobile communications devices is provided. The method is performed by a map server. The method comprises receiving concealed representations of key-point descriptors from one or more mobile communications devices of the group of mobile communications devices. The method further comprises merging the received concealed representations of key-point descriptors with a concealed representation of a point-cloud map representing local environments of the one or more mobile communications devices. The concealed representation of the point-cloud map comprises concealed representations of key-point descriptors which represent visual features of the local environments. The received concealed representations of key-point descriptors and the concealed representations of key-point descriptors comprised in the concealed representation of the point-cloud map are derivable by applying a current permutation to the key-point descriptors derived by the one or more mobile communications devices and key-point descriptors comprised in the point-cloud map, respectively. The current permutation is a shared secret or is derivable from a shared secret. The shared secret is available to the group of mobile communications devices.

According to a sixth aspect of the invention, a method for supporting localization and mapping by a group of mobile communications devices is provided. The method is performed by a trusted server. The method comprises receiving current concealed representations of key-point descriptors from a map server and deriving subsequent concealed representations of the key-point descriptors from the received current concealed representations of key-point descriptors. The subsequent concealed representations are different from the current concealed representations. The method further comprises transmitting the subsequent concealed representations of the key-point descriptors to the map server. The current concealed representations of the key-point descriptors are derivable from the key-point descriptors by applying a current permutation to the point-cloud map. The current permutation is a shared secret or is derivable from a shared secret. The shared secret is available to the group of mobile communications devices.

According to a seventh aspect of the invention, a computer program is provided. The computer program comprises instructions which, when the computer program is executed by a processor comprised in a mobile communications device, cause the mobile communications device to carry out the method according to an embodiment of the fourth aspect of the invention.

According to an eight aspect of the invention, a computer program is provided. The computer program comprises instructions which, when the computer program is executed by a processor comprised in a map server, cause the map server to carry out the method according to an embodiment of the fifth aspect of the invention.

According to a ninth aspect of the invention, a computer program is provided. The computer program comprises instructions which, when the computer program is executed by a processor comprised in a trusted server, cause the trusted server to carry out the method according to an embodiment of the sixth aspect of the invention.

According to a tenth aspect of the invention, a computer-readable storage medium is provided. The computer-readable storage medium has stored thereon the computer program according to the seventh, eight, or ninth, aspect of the invention.

According to an eleventh aspect of the invention, a data carrier signal is provided. The data carrier signal carries the computer program according to the seventh, eight, or ninth, aspect of the invention.

The invention makes use of an understanding that the privacy of point-cloud maps which are stored in a map repository which is accessible by a third party, e.g., a provider of a cloud or edge storage service where the map repository is located, can be improved by concealing key-point descriptors which are comprised in point-cloud maps, and which represent the visual appearance of a 3D environment represented by a point-cloud map, by applying a permutation to the key-point descriptors. Thereby, the visual features which are represented by the key-point descriptors comprised in a point-cloud map become unrecognizable for standard object-recognition algorithms and analytics. As a consequence, analytics, object recognition, and targeted advertising, by a third party which has access to the map repository in which point-cloud maps comprising concealed representations of key-point descriptors are stored is prevented, or at least hampered. Advantageously, concealing key-point descriptors in this way does not hamper collaborative mapping by merging key-point descriptors which are received from one or more mobile communications devices with an existing point-cloud map comprising key-point descriptors. This is achieved by concealing key-point descriptors, by applying the same permutation which is used for concealing the key-point descriptors comprised in the existing point-cloud map, before transmitting the concealed representations of key-point descriptors to the map server, where they are merged with the point-cloud map comprising concealed representations of key-point descriptors. Since all key-point descriptors have been concealed using the same permutation, the matching of key points which relies on calculating the Euclidean norm of the distance between key-point descriptors is not impacted, since the Euclidean norm is invariant if the same permutation is applied to the key-point descriptors. The permutation serves as a key for concealing key-point descriptors.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 5 shows a flow chart illustrating the method for performing localization and mapping, performed by a mobile communications device, in accordance with embodiments of the invention.

FIG. 6 shows a flow chart illustrating the method for supporting localization and mapping by a group of mobile communications devices, performed by a map server, in accordance with embodiments of the invention.

FIG. 7 shows a flow chart illustrating the method for supporting localization and mapping by a group of mobile communications devices, performed by a trusted server, in accordance with embodiments of the invention.

Figure 1:
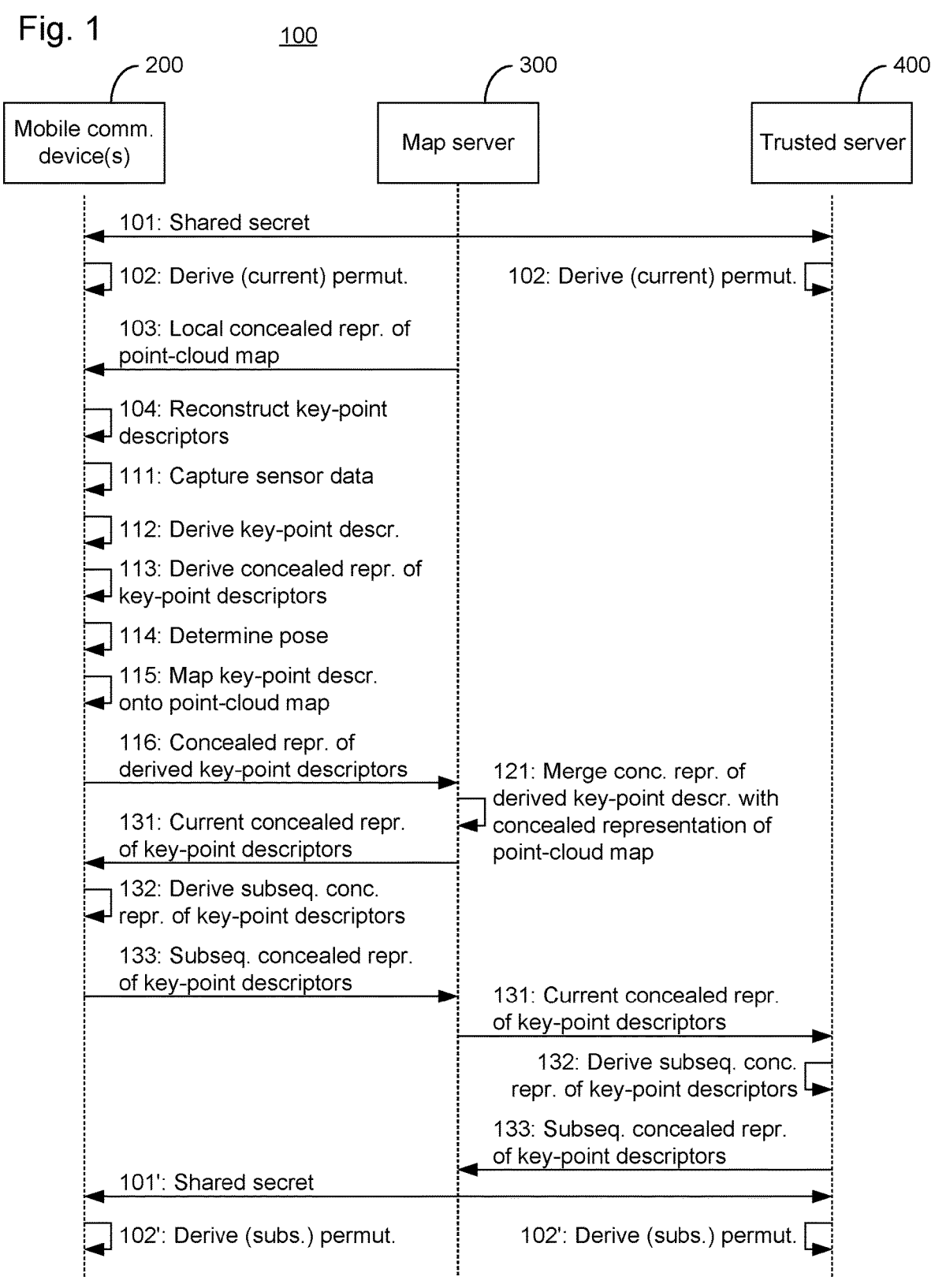
FIG. 1 shows a sequence diagram illustrating localization and mapping of a group of mobile communications devices, in accordance with embodiments of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

In the following, solutions for localization and mapping by a group of mobile communications devices, in particular collaborative mapping, are described. In the present context, the group of communications devices is assumed to be a "closed" group in the sense that all mobile communications devices which are members of the group have access to a point-cloud map which is stored on a map server which is not accessible by mobile communications devices which do not belong to the group. In other words, the mobile communications devices belonging to the group are "trusted". Each of the mobile communications devices may be any one of a smartphone, a mobile phone, a tablet, a laptop, a smartwatch, a Head-Mounted Display (HMD) device, an AR device, an MR device, an autonomous vehicle, and a drone.

Frequently, point-cloud maps or point clouds representing 3D models comprise key points and descriptors which are extracted from visual sensor data, such as digital images captured by monocular or RGB cameras. A key point is a pair of coordinates specifying the location of one or more pixels in a particular image. There are multiple algorithms which can be used for extracting key points, as is described hereinbefore. Once a key point is extracted from visual sensor data, the image area in the vicinity of the key point is characterized by means of a descriptor which represents the visual appearance of one or more objects or a scene in the particular image area in the vicinity of the key point (the local image area). There are different known types of descriptors, as is described hereinbefore.

Whereas different algorithms for localization and/or mapping are known in the art, it is assumed herein that the mobile communications devices utilize a SLAM algorithm in relation to point-cloud maps. Embodiments of the invention are, however, not limited to SLAM, and embodiments of the invention which rely on SfM may easily be envisaged. It is further noted that point-cloud data which is obtained from mobile communications devices may be merged with an existing point-cloud map without performing localization and mapping. This may, e.g., be achieved by employing an Iterative Closest Point (ICP) algorithm known from the field of computer vision.

The map server is assumed to be untrusted, i.e., is not under exclusive control of the members of the group, e.g., a group administrator. Such a situation may arise if the map server storing the point-cloud map is provided as an edge or cloud service under control of a third party. The provider of the edge or cloud service may perform analytics or object recognition on the point-cloud map which may, e.g., be used for targeted advertising, which may not be desired by the members of the group.

Accessing the point-cloud map may involve retrieving, by the mobile communications devices of the group, at least parts of the point-cloud map comprising key-point descriptors for the purpose of performing localization of the mobile communications devices in an environment which is represented by the map, as well as merging key-point descriptors which have been derived by the mobile communications devices with the point-cloud map. The latter is also referred to as collaborative mapping and serves to improve, maintain, or update, the point-cloud map by utilizing sensor data which is captured by the mobile communications devices which are part of the group. Thereby, changes in the environment which is represented by the point-cloud map, e.g., if furniture in an indoor location is moved or replaced, can be reflected in the point-cloud map and thereby made available to the other mobile communications devices which are members of the group. In addition, a new mobile communications device which is equipped with sensors having improved or different sensing capabilities as compared to the sensors of the other mobile communications devices in the group may contribute with new, more accurate, or more detailed, structural and/or visual information which can be merged with the existing point-cloud map.

As an example, the group may comprise all mobile communications devices of the members of a family who would like to share a common point-cloud map representing the family's home. As a further example, the group may comprise all mobile communications devices of the members of a workforce who would like to share a common point-cloud map representing a workplace, a construction site, or the like.

Figure 2:
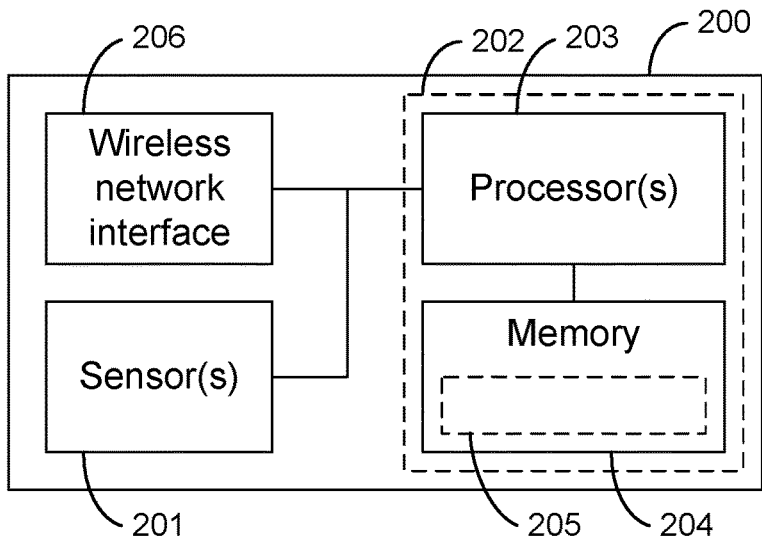
FIG. 2 schematically illustrates the mobile communications device for performing localization and mapping, in accordance with embodiments of the invention.
Figure 3:
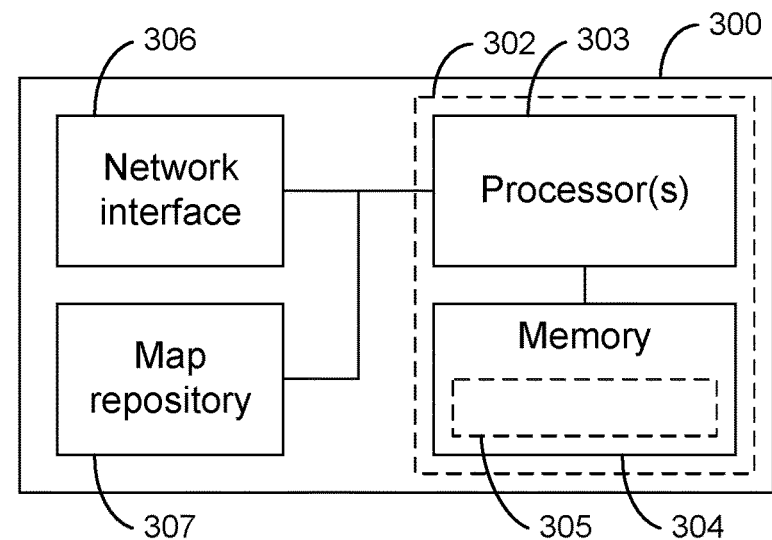
FIG. 3 schematically illustrates the map server for supporting localization and mapping by a group of mobile communications devices, in accordance with embodiments of the invention.
Figure 4:
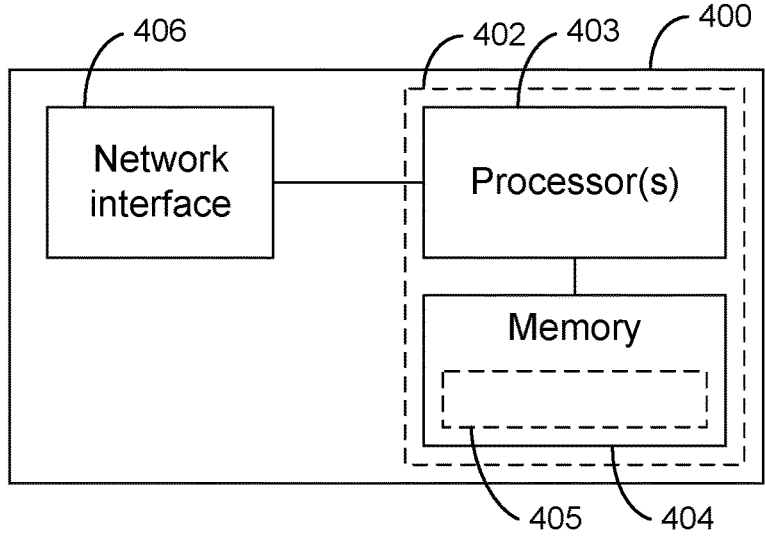
FIG. 4 schematically illustrates the trusted server for supporting localization and mapping by a group of mobile communications devices, in accordance with embodiments of the invention.

FIG. 1 shows a sequence diagram 100 illustrating localization and mapping of a group of mobile communications devices 200, in accordance with embodiments of the invention. Whereas only one mobile communications device 200 is illustrated in FIG. 1, for the sake of simplicity, embodiments of the invention involving more than mobile communications device 200 may easily be envisaged. Reference is also made to FIGS. 2 to 4, which schematically illustrate the mobile communications device 200 for performing localization and mapping, a map server 300 for supporting localization and mapping by a group of mobile communications devices 200, and a trusted server 400 for supporting localization and mapping by a group of mobile communications devices 200, respectively.

The mobile communications device 200 comprises at least one visual sensor 201 operative to capture visual sensor data of a local environment of the mobile communications device, and processing circuitry 202.

The at least one sensor 201 may comprise one or more of a monocular camera and an RGB camera which are operative to capture visual sensor data, such as one or more digital images. The mobile communications device 200 may optionally comprise additional sensors, such as a stereo depth camera, a LIDAR sensor, or any other type of sensor based on which structural information of the local environment can be derived, and which can be used in SLAM and/or SfM algorithms. The local environment of a mobile communications device 200 is the space where the mobile communications device 200 is located, or through which the mobile communications device 200 moves. The size of the local environment is delimited by range of the at least one visual sensor 201, but may also be limited by an extend of mobility of the mobile communications device 200. Mobility may, e.g., be limited due to walls, doors, parts of a building with restricted access, and so forth. For instance, the local environment may be limited to one or more rooms, a corridor, a building, or the like.

The processing circuitry 202 causes the mobile communications device 200 to be operative to derive 112 one or more key-point descriptors (a set of key-point descriptors $\{D_1, D_2, \ldots, D_K\}$) from the visual sensor data which is captured 111 by the at least one visual sensor 201, such as one or more digital images. Herein, each key-point descriptor $D_i$ is assumed to be a finite vector of dimension N, i.e., $D_i=[d_1, d_2, \ldots, d_N]$. The derived key-point descriptors represent visual features of the local environment, e.g., the visual appearance of objects which are present in the real-world space within the local environment. More specifically, each derived key-point descriptor represents the visual appearance of a local image area in the vicinity of the key point. In practice, the number of key points and corresponding key-point descriptors per digital image depends on the richness of the scene captured in the image, i.e., the number of structural features, and image resolution. For example, for 4K-resolution images one can typically extract between 2000 to 5000 key points per image.

The mobile communications device 200 may be operative to derive key-point descriptors from the captured visual sensor data in different ways. For instance, the key-point descriptors may be derived 112 from the visual sensor data by extracting key points from the visual sensor data, using any one of the known methods described hereinbefore, such as Harris Corner Detector, FAST, SURF, SIFT, or MSER. The key-point descriptors can then be derived from the extracted key points, e.g., in any one of the known formats described hereinbefore, such as the SURF descriptor, the SIFT descriptor, the HOG descriptor, or the BRIEF descriptor.

The mobile communications device 200 is further operative to derive 113 concealed representations $$D_i^n$$

of the key-point descriptors $D_i$. This is achieved by applying a current permutation $P^n$ to the key-point descriptors $D_i$, i.e., $$D_i^n = P^n(D_i).$$

The current permutation is applied to each of the key-point descriptors. Key-point descriptors which have undergone a permutation in accordance with embodiments of the invention are also referred to as "concealed" key-point descriptors. The current permutation is the "key" which is used for concealing key-point descriptors.

In the present context, a permutation of a set of elements, such as a key-point descriptor, is a rearrangement of the elements of the set. A permutation $P^n$ can be expressed as a finite vector of the same dimension N as the descriptors, $P^n=[p_1, p_2, \ldots, p_N]$, where each $p_i$ determines the new position of the i-th element of the descriptor:

$$D_i^n = P^n(D_i) = P^n([d_1, d_2, \ldots, d_N]) = [p_1(d_1), p_2(d_2), \ldots, p_N(d_N)].$$

As an example, considering an example descriptor of dimension 5, $D=[d_1, d_2, d_3, d_4, d_5]$, applying a permutation $P^n=[2,4,5,1,3]$ results in a concealed descriptor $D^n=[d_4, d_1, d_5, d_2, d_3]$.

The current permutation $P^n$ is a shared secret, or is derivable from a shared secret. The shared secret is available to the (closed) group of (trusted) mobile communications devices comprising the mobile communications device 200. In the present context, the group of mobile communications devices comprises all mobile communications devices 200 which have been provided with the shared secret. By virtue of the shared secret, they are able to utilize a point cloud-map which comprises a set of current concealed representations $$D_i^n$$

of key-point descriptors $D_i$. Herein, a point-cloud map comprising unconcealed key-point descriptors $D_i$ is denoted M, and a point-cloud map comprising concealed representations $$D_i^n$$

of the key-point descriptors $D_i$ is denoted $M^n$, also referred to as current concealed representation of the point-cloud map M. The current concealed representation of the point-cloud map M is maintained by the map server 300 and can be used by the group of mobile communications devices for localization. The mobile communications devices may also contribute concealed representations $$D_i^n$$

of key-point descriptors for collaborative mapping, by merging the concealed representations of key-point descriptors at the map server 300, as is described further below. Admission to the group and provisioning of the shared secret may be under control of a user of a trusted mobile communications device or a group administrator.

The provisioning and/or distribution of the shared secret can either be performed by one of the mobile communications devices 200 of the group, or the trusted server 400. More specifically, the mobile communications device 200 may be operative to receive the shared secret from another (trusted) mobile communications device of the group of mobile communications devices (not illustrated in FIG. 1), or to receive 101 the shared secret from the trusted server 400, which is described further below. The trusted secret may be acquired by the other mobile communications device, or by the trusted server 400, and distributed to all the mobile communications devices belonging to the group. Alternatively, the mobile communications device 200 may be operative to acquire the shared secret, to transmit the shared secret to other mobile communications devices of the group of mobile communications devices (not illustrated in FIG. 1), and/or to transmit 101 the shared secret to the trusted server 400.

The trusted server 400 is associated with the (closed) group of the (trusted) mobile communications devices and may be under control of one of the users of the mobile communications devices of the group, or a group administrator. The trusted server 400 comprises processing circuitry 402 which may cause the trusted server 400 to be operative to receive 101 the shared secret from a mobile communications device 200 of the group of mobile communications devices. Alternatively, the trusted server 400 may be operative to acquire the shared secret, and to transmit 101 the shared secret to the mobile communications devices 200 of the group of mobile communications devices.

The provisioning of shared secrets within a (closed) group of (trusted) mobile communications devices and servers is known in the art, and not described here in detail. As an example, the shared secret may be manually configured by a user of one of the mobile communications devices of the group, or by a group administrator, or derived using a hash function or a random number generator.

The mobile communications device 200 is further operative to determine 114 a pose of the mobile communications device 200 relative to a point-cloud map M which represents the local environment. The pose of a mobile communications device 200 describes the device's position and orientation in the 3D space which is represented by the point-cloud map. In other words, the map defines the global coordinate system of the 3D space, and the pose of the mobile communications device 200 is expressed relative to that global coordinate system. Optionally, the mobile communications device 200 may further be operative to utilize the determined pose in any application-specific processing. For instance, the determined pose may serve as input to an application which is executed by the mobile communications device 200, e.g., an AR/MR application, an autonomous-driving application, etc.

The mobile communications device 200 is further operative to map 115 the derived key-point descriptors $D_i$ onto the point-cloud map M. Thereby, each derived key-point descriptor is associated with a position in the point-cloud map M. A key-point descriptor $D_i$ and its concealed representation $$D_i^n$$

share the same associated position, i.e., the position is not affected by the permutation. The position may, e.g., be comprised in the key point or the key-point descriptor, or may alternatively be comprised in a separate data structure which is associated with the key point or the key-point descriptor.

The mobile communications device 200 may, e.g., be operative to map 115 the derived (unconcealed) key-point descriptors $D_i$ onto the point-cloud map M by matching the derived key-point descriptors with (unconcealed) key-point descriptors comprised in the point-cloud map. The key-point descriptors comprised in the point-cloud map represent visual features of the local environment. In both SLAM and SfM, the matching of key points is achieved by calculating distances between key-points descriptors, e.g., as the Euclidean norm $e_{ij}$, $$e_{ij}=|D_i-D_j||=\sqrt{\Sigma_k(d_{i,k}-d_{j,k})^2}.$$

Based on the calculated distance between key-point descriptors which are extracted from two images (e.g., one new key-point descriptor which is derived from visual sensor data captured by the mobile communications device 200, and one existing key-point descriptor which is already comprised in the point-cloud map M), the pair of key points with the smallest calculated distance between their descriptors are considered to match, i.e., correspond to each other. Typically, outliers are removed before matching is performed. As a result of the matching, the derived key-point descriptors are associated with positions of key-point descriptors which are comprised in the point-cloud map M and which match the derived key-point descriptors.

If the mapping 115 of the derived key-point descriptors $D_i$ onto the point-cloud map M is based on matching of unconcealed key-point descriptors $D_i$, the mobile communications device 200 may further operative to acquire 103 a concealed representation $M^n$ of the point-cloud map from the map server 300. The concealed representation $M^n$ of the point-cloud map comprises concealed representations of the key-point descriptors representing visual features of the local environment. The mobile communications device 200 is further operative to reconstruct 104 the key-point descriptors representing visual features of the local environment from the concealed representations of the key-point descriptors which are comprised in the concealed representation $M^n$ of the point-cloud map by applying an inverse of the current permutation, $\overline{P^n}$, to the concealed representations of the key-point descriptors comprised in the concealed representation of the point-cloud map, i.e., $$D_i = \overline{P^n}(D_i^n).$$

In general, an inverse $\overline{P}$ of a permutation P, also known as conjugate or reciprocal permutation, restores the original order of a set, i.e., $\overline{P}(P(D_i))=D_i$.

As an alternative, the mapping 115 of the derived key-point descriptors $D_i$ onto the point-cloud map may be based on matching of concealed representations $$D_i^n$$

of key-point descriptors, i.e., key-point descriptors which have undergone permutation. In this case, the point-cloud map representing the local environment is a concealed representation $M^n$ of a point-cloud map, and the mobile communications device 200 is operative to map 115 the derived key-point descriptors $D_i$ onto the concealed representation of the point-cloud map by matching the concealed representations $$D_i^n$$

of the derived key-point descriptors with concealed representations of key-point descriptors comprised in the concealed representation of the point-cloud map $M^n$. The mobile communications device 200 is further operative to associate the derived key-point descriptors $D_i$, and accordingly their concealed representations $$D_i^n,$$

with positions of concealed representations of key-point descriptors comprised in the concealed representation of the point-cloud map which match the concealed representations of the derived key-point descriptors.

The mobile communications device 200 is further operative to transmit 116 the concealed representations $$D_i^n$$

of the key-point descriptors to the map server 300. The concealed representations of the key-point descriptors are transmitted 116 to the map server 300 together with their associated positions in the point-cloud map, for merging 121 of the concealed representations $$D_i^n$$

of the key-point descriptors with a concealed representation $M^n$ of the point-cloud map comprising concealed representations of key-point descriptors. The concealed representations of key-point descriptors comprised in the concealed representation of the point-cloud map $M^n$ have been concealed using the same current permutation $P^n$ as the transmitted concealed representations $$D_i^n$$

of the derived key-point descriptors. The map server 300 is assumed to be an untrusted server, e.g., of an edge or cloud environment, for storing point-cloud maps which can be retrieved by the mobile communications devices 200.

The map server 300 comprises processing circuitry 302 which causes the map server 300 to be operative to receive 116 concealed representations $$D_i^n$$

of key-point descriptors from one or more mobile communications devices 200 of the group of mobile communications devices. The map server 300 is further operative to merge 121 the received concealed representations $$D_i^n$$

of key-point descriptors with a concealed representation $M^n$ of a point-cloud map which represents local environments of the one or more mobile communications devices 200. The concealed representation $M^n$ of the point-cloud map comprises concealed representations of key-point descriptors which represent visual features of the local environments. The concealed representation $M^n$ of the point-cloud map is stored in a map repository accessible by the map server 300, either in a map repository 307 comprised in the map server 300, or in an external map repository. In analogy to what is described above, the received concealed representations $$D_i^n$$

of key-point descriptors and the concealed representations of key-point descriptors comprised in the concealed representation $M^n$ of the point-cloud map are derivable by applying the current permutation $P^n$ to the key-point descriptors $D_i$ derived by the one or more mobile communications devices, and the key-point descriptors comprised in the point-cloud map, respectively.

The current permutation $P^n$ may be the shared secret which is available to the group of mobile communications devices 200, and optionally to the trusted sever 400, as is described hereinbefore. Alternatively, the current permutation $P^n$ may be derivable from the shared secret.

By merging 121 concealed representations $$D_i^n$$

of key-point descriptors which are received 116 from multiple mobile communications devices 200 with the concealed representation $M^n$ of the point-cloud map, the point-cloud map representing the local environments of the mobile communications devices 200 can be continuously updated in a collaborative manner.

Concealing the key-point descriptors comprised in the point-cloud map which is stored at the map server 300, and concealing the key-point descriptors which are transmitted from the mobile communications devices 200 to the map server 300 for merging with the current concealed representation of the point-cloud map, by applying the same permutation to the key-point descriptors, is advantageous in that merging of the concealed representations of the key-point descriptors which are derived by the mobile communications devices with the concealed representations of key-point descriptors which are comprised in the point-cloud map stored at the map serve 300 is not prevented, as is the case with conventional solutions relying on encryption of point-cloud maps. This is the case since the Euclidean norm $e_{ij}=\|D_i-D_j\|=\sqrt{\Sigma_K(d_{i,k}-d_{j,k})^2}$, which is used for calculating the distance between two key-point descriptors based on which matching of the key-point descriptors which are derived by the mobile communications devices which key-point descriptors which are comprised in the map server 300 is invariant to permutations in accordance with embodiments of the invention, i.e., $$\left\| D_i^n - D_j^n \right\| = \sqrt{\sum\nolimits_{k'} \left( d_{i,k'} - d_{j,k'} \right)^2} \equiv \| D_i - D_j \|$$

for any permutation $P^n$.

Therefore, the mobile communications device 200 may be operative to either map 115 the (unconcealed) derived key-point descriptors $D_i$ to the (unconcealed) point-cloud map M, or to map 115 the concealed representations $$D_i^n$$

of the derived key-point descriptors to the concealed point-cloud map $M^n$.

The current permutation $P^n$ may be a combined permutation of a sequence of incremental permutations, i.e., $P^n = p^n$ $(p^{n-1}( \ldots (p^0)))$, where the $p^i$, i=0 . . . n, are permutations. The incremental permutations are applied consecutively, starting with $p^0$, to obtain a combined (the current or a subsequent) permutation. The shared secret may be a subsequent incremental permutation $p^{n+1}$, or the latter may be derived from the shared secret, and the mobile communications device 200 is further operative to derive a subsequent permutation $p^{n+1}$ by applying the subsequent incremental permutation $p^{n+1}$ to the current permutation $P^n$, i.e., $P^{n+1} = p^{n+1}(P^n)$. The thereby derived (subsequent) permutation $P^{n+1}$ becomes the current permutation which is used for deriving concealed representations of key-point descriptors, and reconstructing key-point descriptors from their concealed representations, after all mobile communications devices 200 in the group, and optionally the trusted server 400, have derived the subsequent permutation $P^{n+1}$. The permutation $P^{n+1}$ is used as key for concealing key-point descriptors until a subsequent new shared secret is provisioned and the process of deriving a subsequent permutation starts over.

Deriving the subsequent permutation from a sequence of incremental permutations is advantageous in that an adversary which has not in possession of the entire sequence of incremental permutations is not able to derive the subsequent permutation.

As an alternative to deriving the (current or subsequent) permutation as a combined permutation of incremental permutation, the new shared secret may also replace the current permutation, or the latter may be derived from the new shared secret.

The shared secret me be updated occasionally, regularly, or periodically, by provisioning a new shared secret among the group of mobile communications devices 200, and optionally the trusted sever 400. This is illustrated in the sequence diagram 100 of FIG. 1, which starts with provisioning 101 of a shared secret, from the which the (current) permutation is derived 102, and which is used as key for concealing key-point descriptors until a new shared secret is provisioned 101' and the (subsequent) permutation is derived 102'.

For instance, a new shared secret may be provisioned 101/101' every hour, every day, every week, every month, or according to any suitable regular or irregular schedule. A new shared secret may also be provisioned 101/101' if a new mobile communications device joins or leaves the group, or if the environments in which the group of mobile communications devices operates changes. This may, e.g., be the case if a workforce is assigned to a new workplace, such as a construction site.

After the mobile communications devices 200 of the group, and optionally the trusted server 400, have derived 102' the subsequent permutation $P^{n+1}$, the subsequent permutation is used as current permutation in deriving concealed representations of key-point descriptors by the mobile communications devices 200. In order for the map server 300 to be able to merge 121 concealed representations $$D_i^n$$

of key-point descriptors, which are transmitted 116 from the mobile communications devices 200 to the map server 300, with the concealed representations of key-point descriptors comprised in the concealed representation $M^{n+1}$ of the point-cloud map which is maintained by the map server 300, the concealed representations of key-point descriptors comprised in the concealed representation $M^{n+1}$ of the point-cloud map need to be concealed with the same permutation $P^{n+1}$ which is used by the mobile communications devices 200 for deriving 113 concealed representations $$D_i^n$$

of derived key-point descriptors. Since the map server 300 is untrusted, i.e., has not access to the shared secret or the current permutation which is available to the (closed) group of the (trusted) mobile communications devices 200, and optionally the trusted server 400, it is envisaged that a subsequent concealed representation $M^{n+1}$ of the point-cloud map, i.e., a concealed representation of the point-cloud map comprising subsequent concealed representations of the key-point descriptors, is derived by one of the mobile communications devices 200 of the group, or the trusted server 400, as is described in the following.

The map server 300 may be operative to transmit 131 current concealed representations of key-point descriptors which are comprised in the current concealed representation $M^n$ of the point-cloud map to a mobile communications device 200 of the group of mobile communications devices, or to the trusted server 400, and to receive 133 subsequent concealed representations of key-point descriptors from the mobile communications device 200, or from the trusted server 400, respectively. The subsequent concealed representations are different from the current concealed representations but represents the same (reconstructed) key-point descriptors. The map server 300 may be operative to transmit and receive the concealed representations of key-point descriptors comprised in corresponding concealed representations of the point-cloud map, $M^n$ and $M^{n+1}$, respectively, or in separate data structures.

Correspondingly, the mobile communications device 200 may be operative to receive 131 current concealed representations of key-point descriptors from the map server 300, derive 132 subsequent concealed representations of the key-point descriptors from the current concealed representations of the key-point descriptors, and transmit 133 the subsequent concealed representations of the key-point descriptors to the map server 300. The mobile communications device 200 may be operative to derive 132 the subsequent concealed representations of the key-point descriptors by applying a subsequent incremental permutation $p^{n+1}$, which may have been provisioned 101' as the shared secret, to the current concealed representations of the key-point descriptors.

As an alternative, the mobile communications device 200 may be operative to derive 132 subsequent concealed representations of the key-point descriptors by applying the inverse $\overline{P^n}$ of the current permutation $P^n$ to the current concealed representations of the key-point descriptors, to reconstruct the (unconcealed) key-point descriptors, and then apply the derived 102' subsequent permutation $P''^{+1}$ to the reconstructed key-point descriptors.

The mobile communications device 200 may be operative to receive and transmit the concealed representations of key-point descriptors comprised in corresponding concealed representations of the point-cloud map, $M''$ and $M''^{+1}$, respectively, or in separate data structures.

The trusted server 400 may correspondingly be operative to receive 131 current concealed representations of key-point descriptors from the map server 300, derive 132 the subsequent concealed representations of the key-point descriptors from the current concealed representations of the key-point descriptors, and transmit 133 the subsequent concealed representations of the key-point descriptors to the map server 300. Similar to what is described above, the current concealed representations of the key-point descriptors are derivable by applying a current permutation $P''$ to the key-point descriptors, and the current permutation is a shared secret, or is derivable from a shared secret, which shared secret is available to the group of mobile communications devices 200. The current permutation $P''$ may be a combined permutation of a sequence of incremental permutations $p^i$. In this case the trusted server 400 may be operative to derive 132 the subsequent concealed representations of the key-point descriptors by applying a subsequent incremental permutation $p''^{+1}$, which may have been provisioned 101' as the shared secret, to the current concealed representations of the key-point descriptors.

As an alternative, the trusted server 400 may be operative to derive 132 the subsequent concealed representations of the key-point descriptors by applying the inverse $\overline{P''}$ of the current permutation $P''$ to the current concealed representations of the key-point descriptors, to reconstruct the key-point descriptors, and then apply the derived 102' subsequent permutation $P''^{+1}$ to the reconstructed key-point descriptors.

The trusted server 400 may be operative to receive and transmit the concealed representations of key-point descriptors comprised in corresponding concealed representations of the point-cloud map, $M''$ and $M''^{+1}$, respectively, or in separate data structures.

If the mobile communications device 200 is operative to acquire 103 a current concealed representation $M''$ of the point-cloud map representing the local environment of the mobile communications device 200 from the map server 300, as is described hereinbefore, it may be operative to request, and receive 103, a concealed representation of the point-cloud map which represents its current local environment. The received 103 local concealed representation of the point-cloud map may be a subset of the current concealed representation of the point-cloud map stored at the map server 300. Thereby, the mobile communications device 200 may acquire 103 a local map from the map server 300 which represents a sufficiently large space of the current local environment of the mobile communications device 200 for performing location and/or mapping. Advantageously, embodiments of the invention allow to extract a local concealed representation of the point-cloud map from the concealed representation of the point-cloud map simply as a subset of the points comprised in the point-cloud map, including key points and their descriptors, without reconstructing the original point-cloud map. Solutions which rely on encrypted point-cloud maps do not allow extracting a local map as a subset without knowledge of the encryption key.

For instance, the mobile communications device 200 may request the local concealed representation of the point-cloud map based on its current position or location, which it may determine using a location sensor which is comprised in the mobile communications device 200 (not shown in FIG. 2). Such a location sensor may, e.g., be based on the Global Positioning System (GPS), the Global Navigation Satellite System (GNSS), China's BeiDou Navigation Satellite System (BDS), GLONASS, or Galileo, or may receive location information via the wireless network interface 206, e.g., from a location-information server (not illustrated in the Figures). The current location or position may, e.g., be determined based on radio triangulation, radio fingerprinting, or crowd-sourced identifiers which are associated with known locations of access points of wireless communications networks (e.g., cell-IDs or WLAN SSIDs). Alternatively, the current location or position may also be determined based on a beacon which is received via the wireless network interface 206, e.g., a beacon which is transmitted inside a confined area such as a business location, a workspace a factory, an office space, a family home, or the like.

If the mobile communications device 200 changes location or position, a new local concealed representation of a point-cloud map may be acquired which represents the new current local environment of the mobile communications device 200.

Correspondingly, the map server 300 may be operative to transmit 103 a local concealed representation of the point-cloud map to a mobile communications device 200 of the group of mobile communications devices, the local concealed representation of the point-cloud map representing the local environment of the mobile communications device 200, as is described hereinbefore. The map server 300 may be operative to transmit 103 the local concealed representation of the point-cloud map in response to receiving a request for a local map from the mobile communications device 200. Alternatively, the map server 300 may be operative to receive regular or occasional location or position updates from the mobile communications device 200 and transmit 103 a local concealed representation of the point-cloud map to the mobile communications device 200, which local concealed representation of the point-cloud map represent a sufficiently large space of the current local environment of the mobile communications device 200 for performing location and/or mapping.

The embodiments of the invention which are described hereinbefore rely on concealing key-point descriptors by the mobile communications device 200, before transmitting concealed representations of the key-point descriptors to the map server 300 for merging with a current concealed representation of a point-cloud map, comprising current concealed representations of key-point descriptors, for the purpose of collaborative mapping. One may also envisage alternative embodiments of the invention why rely on concealing key-point descriptors, which were derived by the mobile communications devices, by the trusted server 400 (not illustrated in the Figures). In this case, the trusted server 400 may be operative to receive (unconcealed) key-point descriptors $D_i$ from one or more mobile communications devices 200, which key-point descriptors represent visual features of local environments of the one or more mobile communications devices 200. The trusted server 400 is further operative to derive concealed representations $$D_i^n$$

of the key-point descriptors, and transmit the concealed representations of the key-point descriptors to the map server 300. The concealed representation $$D_i^n$$

of the key-point descriptors $D_i$ are derived by applying a current permutation $P^n$ to the key-point descriptors, as is described hereinbefore. The concealed representations $$D_i^n$$

of the key-point descriptors are transmitted to the map server 300 for merging of the concealed representations of the key-point descriptors with a concealed representation $M^n$ of the point-cloud map comprising concealed representations of key-point descriptors. The concealed representations $$D_i^n$$

of the key-point descriptors are transmitted to the map server 300 together with their associated positions in the point-cloud map. The associated positions may, e.g., be received with the (unconcealed) key-point descriptors $D_i$ from the one or more mobile communications devices 200. Alternatively, the trusted server 400 may be operative to derive the associated positions by determining a pose of the mobile communications device from which the key-point descriptors were received relative to the point-cloud map, and mapping the key-point descriptors onto the point-cloud map, thereby associating each derived key-point descriptor with a position in the point-cloud map.

In the following, embodiments of the mobile communications device 200, the map server 300, and the trusted server 400, are described with reference to FIGS. 2 to 4.

With reference to FIG. 2, the mobile communications device further comprises a wireless network interface 206 for effecting communications with other mobile communications devices 200, the map server 300, the trusted server 400, and/or any other network nodes or communication networks. The wireless network interface 206 may comprise one or more of a cellular modem (e.g., GSM, UMTS, LTE, 5G, NR/NX), a WLAN/Wi-Fi modem, a Bluetooth modem, a Near-Field Communication (NFC) modem, or the like.

The processing circuitry 202 may comprise one or more processors 203, such as Central Processing Units (CPUs), microprocessors, application-specific processors, Graphics Processing Units (GPUs), and Digital Signal Processors (DSPs) including image processors, or a combination thereof, and a memory 204 comprising a computer program 205 comprising instructions. When executed by the processor(s) 203, the computer program 205 causes the mobile communications device 200 to be operative in accordance with embodiments of the invention described herein. The memory 204 may, e.g., be a Random-Access Memory (RAM), a Read-Only Memory (ROM), a Flash memory, or the like. The computer program 205 may be downloaded to the memory 204 by means of the wireless network interface 206, as a data carrier signal carrying the computer program 205.

The processing circuitry 202 may alternatively or additionally comprise one or more Application-Specific Integrated Circuits (ASICs), Field-Programmable Gate Arrays (FPGAs), or the like, which are operative to cause the mobile communications device 200 to be operative in accordance with embodiments of the invention described herein.

The mobile communications device 200 may comprise alternative or additional components, such as one or more displays, microphones, loudspeakers, wired communications interfaces, or the like (not illustrated in FIG. 2).

With reference to FIG. 3, the map server 300 further comprises a network interface 306 for effecting communications with the mobile communications devices 200, the trusted server 400, and/or any other network nodes or communication networks. The network interface 306 may implement any suitable wired or wireless communications technology, such as Ethernet, GSM, UMTS, LTE, 5G, NR/NX, WLAN/Wi-Fi, Bluetooth, NFC, or the like.

The processing circuitry 302 may comprise one or more processors 303, such as CPUs, microprocessors, application-specific processors, GPUs, and DSPs including image processors, or a combination thereof, and a memory 304 comprising a computer program 305 comprising instructions. When executed by the processor(s) 303, the computer program 305 causes the map server 300 to be operative in accordance with embodiments of the invention described herein. The memory 304 may, e.g., be a RAM, a ROM, a Flash memory, or the like. The computer program 305 may be downloaded to the memory 304 by means of the network interface 306, as a data carrier signal carrying the computer program 305. The map repository 307 may be part of the memory 304 or comprised in a separate memory or data storage.

The processing circuitry 302 may alternatively or additionally comprise one or more ASICs, FPGAs, or the like, which are operative to cause the map server 300 to be operative in accordance with embodiments of the invention described herein.

With reference to FIG. 4, the trusted server 400 further comprises a network interface 406 for effecting communications with the mobile communications devices 200, the map server 300, and/or any other network nodes or communication networks. The network interface 406 may implement any suitable wired or wireless communications technology, such as Ethernet, GSM, UMTS, LTE, 5G, NR/NX, WLAN/Wi-Fi, Bluetooth, NFC, or the like.

The processing circuitry 402 may comprise one or more processors 403, such as CPUs, microprocessors, application-specific processors, GPUs, and DSPs including image processors, or a combination thereof, and a memory 404 comprising a computer program 405 comprising instructions. When executed by the processor(s) 403, the computer program 405 causes the trusted server 400 to be operative in accordance with embodiments of the invention described herein. The memory 404 may, e.g., be a RAM, a ROM, a Flash memory, or the like. The computer program 405 may be downloaded to the memory 404 by means of the network interface 406, as a data carrier signal carrying the computer program 405.

The processing circuitry 402 may alternatively or additionally comprise one or more ASICs, FPGAs, or the like, which are operative to cause the trusted server 400 to be operative in accordance with embodiments of the invention described herein.

The exchange of information and data between the mobile communications devices 200, the map sever 300, the trusted server 400, and/or any other network nodes or communication networks, may be effected using one or more suitable protocols, e.g., the Hypertext Transfer Protocol (HTTP), the Transmission Control Protocol/Internet Protocol (TCP/IP) suite, the Constrained Application Protocol (CoAP), the User Datagram Protocol (UDP), or the like. The point-cloud maps, including key points, 3D coordinates, descriptors, and concealed representations thereof, may be stored and transmitted using any suitable format, e.g., the Point Cloud Data (PCD) file format or the Polygon File Format (PLY), and any database format for storing the associated descriptors, e.g., SQLite, MySQL, dBASE II, Microsoft Access, Mobile Device Database File, and the like.

In the following, embodiments of the method for performing localization and mapping are described with reference to FIG. 5. The method 500 is performed by a mobile communications device 200 and comprises capturing 503 visual sensor data of a local environment of the mobile communications device. The visual sensor data is captured 503 using at least one visual sensor which is comprised in the mobile communications device. The method 500 further comprises deriving 504 key-point descriptors from the visual sensor data, and deriving 505 concealed representations of the derived key-point descriptors. The derived key-point descriptors represent visual features of the local environment. The concealed representations of the derived key-point descriptors are derived 505 by applying a current permutation to the derived key-point descriptors. The method 500 further comprises determining 506 a pose of the mobile communications device relative to a point-cloud map representing the local environment, and mapping 507 the derived key-point descriptors onto the point-cloud map. Thereby, each derived key-point descriptor is associated with a position in the point-cloud map. The method 500 further comprises transmitting 508 the concealed representations of the derived key-point descriptors to a map server 300. The concealed representations of the derived key-point descriptors are transmitted 508 together with their associated positions in the point-cloud map. The current permutation is a shared secret, or is derivable from a shared secret, which shared secret is available to a group of mobile communications devices comprising the mobile communications device.

The derived key-point descriptors may be mapped 507 onto the point-cloud map by matching the derived key-point descriptors with key-point descriptors comprised in the point-cloud map, and associating the derived key-point descriptors with positions of key-point descriptors comprised in the point-cloud map which match the derived key-point descriptors. The key-point descriptors comprised in the point-cloud map represent visual features of the local environment. Optionally, the method 500 further comprises acquiring 501 a concealed representation of the point-cloud map from the map server 300, and reconstructing 502 the key-point descriptors representing visual features of the local environment from the concealed representations of the key-point descriptors comprised in the concealed representation of the point-cloud map. The concealed representation of the point-cloud map comprises concealed representations of the key-point descriptors representing visual features of the local environment. The key-point descriptors representing visual features of the local environment are reconstructed 502 by applying an inverse of the current permutation to the concealed representations of the key-point descriptors comprised in the concealed representation of the point-cloud map.

As an alternative, if the point-cloud map representing the local environment is a concealed representation of a point-cloud map, the derived key-point descriptors may be mapped 507 onto the concealed representation of the point-cloud map by matching the concealed representations of the derived key-point descriptors with concealed representations of key-point descriptors comprised in the concealed representation of the point-cloud map, and associating the derived key-point descriptors with positions of concealed representations of key-point descriptors comprised in the concealed representation of the point-cloud map which match the concealed representations of the derived key-point descriptors. The key-point descriptors comprised in the concealed representation of the point-cloud map represent visual features of the local environment.

The key-point descriptors may be derived 504 from the visual sensor data by extracting key points from the visual sensor data, and deriving the key-point descriptors from the extracted key points.

The current permutation may be a combined permutation of a sequence of incremental permutations, and the shared secret may be a subsequent incremental permutation. In this case, the method 500 further comprises deriving a subsequent permutation by applying the acquired subsequent incremental permutation to the current permutation.

The method 500 may further comprise receiving 509 current concealed representations of key-point descriptors from the map server 300, deriving 510 subsequent concealed representations of the key-point descriptors from the current concealed representations of the key-point descriptors, and transmitting 511 the subsequent concealed representations of the key-point descriptors to the map server 300. The subsequent concealed representations are different from the received current concealed representations. The subsequent concealed representations of the key-point descriptors may be derived 510 by applying a subsequent incremental permutation to the current concealed representations of the key-point descriptors.

The concealed representations of the derived key-point descriptors are transmitted 508 to the map server for merging of the concealed representations of the derived key-point descriptors with a concealed representation of the point-cloud map comprising concealed representations of derived key-point descriptors. The concealed representations of key-point descriptors comprised in the concealed representation of the point-cloud map have been concealed using the same current permutation as the transmitted concealed representations of the derived key-point descriptors.

It will be appreciated that the method 500 may comprise additional, alternative, or modified, steps in accordance with what is described throughout this disclosure. An embodiment of the method 500 may be implemented as the computer program 205 comprising instructions which, when executed by the one or more processor(s) 203 comprised in the mobile communications device 200, cause the mobile communications device 200 to be operative in accordance with embodiments of the invention described herein. The mobile communications device may be any one of a smartphone, a mobile phone, a tablet, a laptop, a smartwatch, a head-mounted display device, an AR device, an MR device, an autonomous vehicle, and a drone.

In the following, embodiments of the method for supporting localization and mapping by a group of mobile communications devices are described with reference to FIG. 6. The method 600 is performed by a map server 300 and comprises receiving 602 concealed representations of key-point descriptors from one or more mobile communications devices of the group of mobile communications devices, and merging 603 the received concealed representations of key-point descriptors with a concealed representation of a point-cloud map representing local environments of the one or more mobile communications devices. The concealed representation of the point-cloud map comprises concealed representations of key-point descriptors representing visual features of the local environments. The received concealed representations of key-point descriptors and the concealed representations of key-point descriptors comprised in the concealed representation of the point-cloud map are derivable by applying a current permutation to the key-point descriptors derived by the one or more mobile communications devices and key-point descriptors comprised in the point-cloud map, respectively. The current permutation is a shared secret, or is derivable from a shared secret, which shared secret is available to the group of mobile communications devices.

The method 600 may further comprise transmitting 604 current concealed representations of key-point descriptors to a mobile communications device of the group of mobile communications devices, or to a trusted server, and receiving 605 subsequent concealed representations of the key-point descriptors from the mobile communications device, or from the trusted server. The subsequent concealed representations are different from the current concealed representation.

The method 600 may further comprise transmitting 601 a local concealed representation of a point-cloud map to a mobile communications device of the group of mobile communications devices. The local concealed representation of the point-cloud map comprises concealed representations of key-point descriptors representing visual features of the local environment of the mobile communications device.

It will be appreciated that the method 600 may comprise additional, alternative, or modified, steps in accordance with what is described throughout this disclosure. An embodiment of the method 600 may be implemented as the computer program 305 comprising instructions which, when executed by the one or more processor(s) 303 comprised in the map server 300, cause the map server 300 to be operative in accordance with embodiments of the invention described herein.

In the following, embodiments of the method for supporting localization and mapping by a group of mobile communications devices are described with reference to FIG. 7. The method 700 is performed by a trusted server 400 and comprises receiving 701 current concealed representations of key-point descriptors from a map server, deriving 702 subsequent concealed representations of the key-point descriptors from the received current concealed representations of key-point descriptors, and transmitting 703 the subsequent concealed representations of the key-point descriptors to the map server. The subsequent concealed representations are different from the current concealed representations. The current concealed representations of the key-point descriptors are derivable from the key-point descriptors by applying a current permutation to the point-cloud map. The current permutation is a shared secret, or is derivable from a shared secret, which shared secret is available to the group of mobile communications devices.

The current permutation may be a combined permutation of a sequence of incremental permutations, and the shared secret may be a subsequent incremental permutation. In this case the method 700 further comprises deriving the subsequent concealed representations of the key-point descriptors by applying the subsequent incremental permutation to the current concealed representations of the key-point descriptors.

The method 700 may further comprise receiving 704 key-point descriptors from one or more mobile communications devices, deriving 705 concealed representations of the received key-point descriptors, and transmitting 706 the concealed representations of the key-point descriptors together with their associated positions in the point-cloud map, to the map server. The key-point descriptors represent visual features of the local environments. The concealed representations of the received key-point descriptors are derived 705 by applying a current permutation to the received key-point descriptors. The concealed representations of the key-point descriptors are transmitted 706 to the map server for merging of the concealed representations of the key-point descriptors with a concealed representation of the point-cloud map comprising concealed representations of key-point descriptors.

It will be appreciated that the method 700 may comprise additional, alternative, or modified, steps in accordance with what is described throughout this disclosure. An embodiment of the method 700 may be implemented as the computer program 405 comprising instructions which, when executed by the one or more processor(s) 403 comprised in the trusted server 400, cause the trusted server 400 to be operative in accordance with embodiments of the invention described herein.

The person skilled in the art realizes that the invention by no means is limited to the embodiments described above. On the contrary, many modifications and variations are possible within the scope of the appended claims.

The invention claimed is:

1. A mobile communications device for performing localization and mapping, the mobile communications device comprising:

at least one visual sensor operative to capture visual sensor data of a local environment of the mobile communications device, and processing circuitry causing the mobile communications device to be operative to:

derive key-point descriptors from the visual sensor data, the derived key-point descriptors representing visual features of the local environment;

derive concealed representations of the derived key-point descriptors, by applying a current permutation to each derived key-point descriptor;

determine a pose of the mobile communications device relative to a point-cloud map representing the local environment, wherein the point-cloud map representing the local environment is a concealed representation of a point-cloud map;

map the derived key-point descriptors onto the point-cloud map, thereby associating each derived key-point descriptor with a position in the point-cloud map, by matching the concealed representations of the derived key-point descriptors with concealed representations of key-point descriptors comprised in the concealed representation of the point-cloud map, the key-point descriptors comprised in the concealed representation of the point-cloud map representing visual features of the local environment, and associating the derived key-point descriptors with positions of concealed representations of key-point descriptors comprised in the concealed representation of the point-cloud map which match the concealed representations of the derived key-point descriptors; and transmit the concealed representations of the derived key-point descriptors, together with associated positions of the derived key-point descriptors in the point-cloud map, to a map server, wherein the current permutation is a shared secret or is derivable from a shared secret, which shared secret is available to a group of mobile communications devices comprising the mobile communications device.

2. The mobile communications device according to claim 1, further operative to:

acquire the concealed representation of the point-cloud map from the map server, and reconstruct the key-point descriptors representing visual features of the local environment from the concealed representations of the key-point descriptors comprised in the concealed representation of the point-cloud map, by applying an inverse of the current permutation to the concealed representations of the key-point descriptors comprised in the concealed representation of the point-cloud map.

3. The mobile communications device according to claim 1, operative to derive key-point descriptors from the visual sensor data by:

extracting key points from the visual sensor data, and deriving the key-point descriptors from the extracted key points.

4. The mobile communications device according to claim 1, wherein the current permutation is a combined permutation of a sequence of incremental permutations, and the shared secret is a subsequent incremental permutation, the mobile communications device further operative to derive a subsequent permutation by applying the subsequent incremental permutation to the current permutation.

5. The mobile communications device according to claim 1, further operative to:

receive current concealed representations of key-point descriptors from the map server, derive subsequent concealed representations of the key-point descriptors from the received current concealed representations of the key-point descriptors, which subsequent concealed representations are different from the received current concealed representations, and transmit the subsequent concealed representations of the key-point descriptors to the map server.

6. The mobile communications device according to claim 5, operative to derive the subsequent concealed representations of the key-point descriptors by applying a subsequent incremental permutation to the received current concealed representations of the key-point descriptors.

7. The mobile communications device according to claim 1, wherein the concealed representations of the derived key-point descriptors are transmitted to the map server for merging of the concealed representations of the derived key-point descriptors with another concealed representation of the point-cloud map comprising concealed representations of key-point descriptors, which concealed representations of key-point descriptors comprised in the another concealed representation of the point-cloud map have been concealed using the same current permutation as the transmitted concealed representations of the derived key-point descriptors.

8. The mobile communications device according to claim 1, wherein the at least one visual sensor comprises one or more of a monocular camera and an RGB camera, and the visual sensor data comprises one or more digital images.

9. The mobile communications device according to claim 1, being any one of: a smartphone, a mobile phone, a tablet, a laptop, a smartwatch, a head-mounted display device, an Augmented-Reality device, a Mixed-Reality device, an autonomous vehicle, and a drone.

10. A method for performing localization and mapping, the method being performed by a mobile communications device and comprising:

capturing visual sensor data of a local environment of the mobile communications device, using at least one visual sensor comprised in the mobile communications device;

deriving key-point descriptors from the visual sensor data, the derived key-point descriptors representing visual features of the local environment;

deriving concealed representations of the derived key-point descriptors, by applying a current permutation to each derived key-point descriptor;

determining a pose of the mobile communications device relative to a point-cloud map representing the local environment, wherein the point-cloud map representing the local environment is a concealed representation of a point-cloud map;

mapping the derived key-point descriptors onto the point-cloud map, thereby associating each derived key-point descriptor with a position in the point-cloud map, by matching the concealed representations of the derived key-point descriptors with concealed representations of key-point descriptors comprised in the concealed representation of the point-cloud map, the key-point descriptors comprised in the concealed representation of the point-cloud map representing visual features of the local environment, and associating the derived key-point descriptors with positions of concealed representations of key-point descriptors comprised in the concealed representation of the point-cloud map which match the concealed representations of the derived key-point descriptors; and transmitting the concealed representations of the derived key-point descriptors, together with associated positions of the derived key-point descriptors in the point-cloud map, to a map server, wherein the current permutation is a shared secret or is derivable from a shared secret, which shared secret is available to a group of mobile communications devices comprising the mobile communications device.

11. The method according to claim 10, further comprising:

acquiring the concealed representation of the point-cloud map from the map server, and reconstructing the key-point descriptors representing visual features of the local environment from the concealed representations of the key-point descriptors comprised in the concealed representation of the point-cloud map, by applying an inverse of the current permutation to the concealed representations of the key-point descriptors comprised in the concealed representation of the point-cloud map.

12. The method according to claim 10, wherein deriving key-point descriptors from the visual sensor data comprises:

extracting key points from the visual sensor data, and deriving the key-point descriptors from the extracted key points.

13. The method according to claim 10, wherein the current permutation is a combined permutation of a sequence of incremental permutations, and the shared secret is a subsequent incremental permutation, the method further comprising:

deriving a subsequent permutation by applying the subsequent incremental permutation to the current permutation.

14. The method according to claim 10, further comprising:

receiving current concealed representations of key-point descriptors from the map server, deriving subsequent concealed representations of the key-point descriptors from the received current concealed representations of the key-point descriptors, which subsequent concealed representations are different from the received current concealed representations, and transmitting the subsequent concealed representations of the key-point descriptors to the map server.

15. The method according to claim 14, further comprising:

deriving the subsequent concealed representations of the key-point descriptors by applying a subsequent incremental permutation to the received current concealed representations of the key-point descriptors.

16. The method according to claim 10, wherein the concealed representations of the derived key-point descriptors are transmitted to the map server for merging of the concealed representations of the derived key-point descriptors with another concealed representation of the point-cloud map comprising concealed representations of key-point descriptors, which concealed representations of key-point descriptors comprised in the another concealed representation of the point-cloud map have been concealed using the same current permutation as the transmitted concealed representations of the derived key-point descriptors.

17. The method according to claim 10, wherein the at least one visual sensor comprises one or more of a monocular camera and an RGB camera, and the visual sensor data comprises one or more digital images.

18. The method according to claim 10, wherein the mobile communications device comprises one of: a smartphone, a mobile phone, a tablet, a laptop, a smartwatch, a head-mounted display device, an Augmented-Reality device, a Mixed-Reality device, an autonomous vehicle, and a drone.

* * * * *